United States Patent [19]

Noland

[11] Patent Number: 5,160,222

[45] Date of Patent: Nov. 3, 1992

[54] PNEUMATIC CONVEYING SYSTEM

[75] Inventor: Richard D. Noland, Lake Quivira, Kans.

[73] Assignee: Tech-Air, Inc., Shawnee Mission, Kans.

[21] Appl. No.: 621,329

[22] Filed: Nov. 30, 1990

[51] Int. Cl.⁵ .................. B65G 53/12; B65G 53/36; B65G 53/40; B65G 53/46

[52] U.S. Cl. .................. 406/124; 406/125; 406/128; 406/130; 406/192; 406/109; 406/122; 406/146

[58] Field of Search ............ 406/124, 125, 127, 128, 406/130, 131, 109, 139, 50, 85, 192, 146, 122

[56] References Cited

U.S. PATENT DOCUMENTS

| 699,405 | 5/1902 | Newhouse | 406/125 X |
|---|---|---|---|
| 1,309,671 | 7/1919 | Weaver | 406/125 X |
| 1,684,370 | 9/1928 | Schuster | 406/125 X |
| 1,943,589 | 1/1934 | Domina | 406/124 X |
| 2,819,122 | 1/1958 | Schneider | 406/125 |
| 3,197,260 | 7/1965 | Kauffman | . |
| 3,272,562 | 9/1966 | Kauffman | . |
| 3,437,384 | 4/1969 | Bozich | . |
| 3,861,830 | 1/1975 | Johnson | 406/85 X |
| 4,111,492 | 9/1978 | Mraz | 406/125 X |
| 4,118,075 | 10/1978 | Lübbehusen | 406/125 X |
| 4,439,073 | 3/1984 | White | 406/125 |
| 4,776,730 | 10/1988 | Nearen et al. | 406/128 X |
| 4,955,989 | 9/1990 | Mink | 406/124 X |

FOREIGN PATENT DOCUMENTS

| 615970 | 7/1935 | Fed. Rep. of Germany | 406/125 |
|---|---|---|---|
| 1094662 | 12/1960 | Fed. Rep. of Germany | 406/124 |
| 2443865 | 3/1976 | Fed. Rep. of Germany | 406/125 |
| 3528301 | 2/1987 | Fed. Rep. of Germany | 406/128 |
| 26825 | 2/1984 | Japan | 406/124 |
| 8200992 | 4/1982 | World Int. Prop. O. | 406/124 |

Primary Examiner—Margaret A. Focarino
Assistant Examiner—James M. Kannofsky
Attorney, Agent, or Firm—Kokjer, Kircher, Bowman & Johnson

[57] ABSTRACT

A pneumatic conveying system for particulate material. An upper vessel includes an inlet for the material. An intermediate housing is open to and located under the inlet. A primary check valve is located in the intermediate housing and will receive the material from the inlet. A lower housing is located beneath the intermediate housing. The lower housing includes a secondary check valve therein which receives the material from the primary check valve. A material exit is located below the secondary check valve. Each of the check valves includes an opening through which the material may flow. This opening is oblique to vertical, and a movable closure member is connected to alternatively open or seal the opening. Pressurized air is supplied to the check valves in an alternating manner. Air pressure delivered through the air inlet associated with the intermediate housing causes the closure gate of the intermediate housing to close and the closure gate of the lower housing to open, thus carrying particulate material received by the intermediate housing to the lower housing and out through the exit port to a material conveying conduit. Air pressure delivered through the air inlet associated with the lower housing causes the closure gate of the lower housing to close and the air stream to travel through the exit port of the lower housing, thus carrying any residual particulate material from the lower housing out through the exit port to a material conveying conduit.

14 Claims, 4 Drawing Sheets

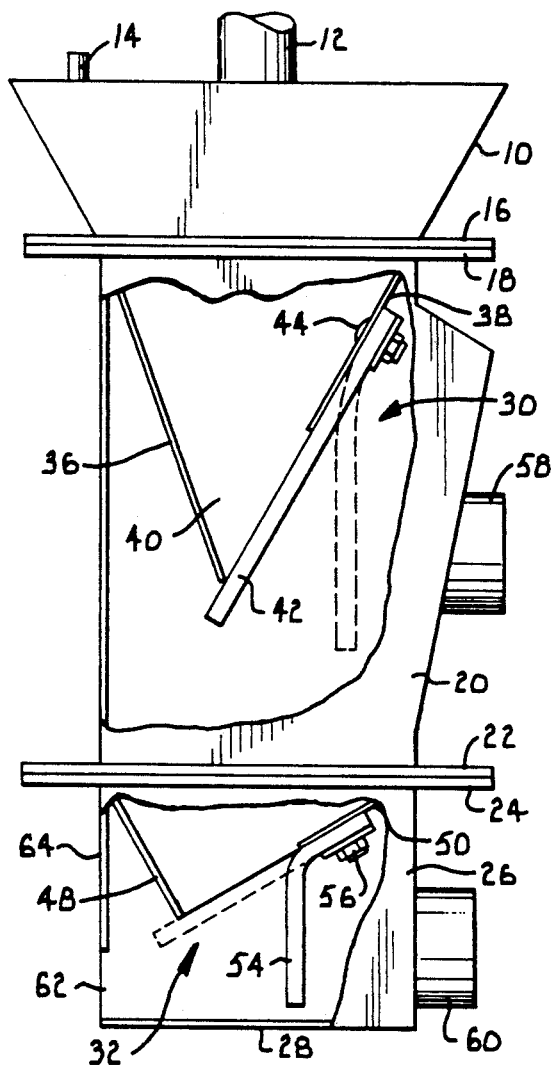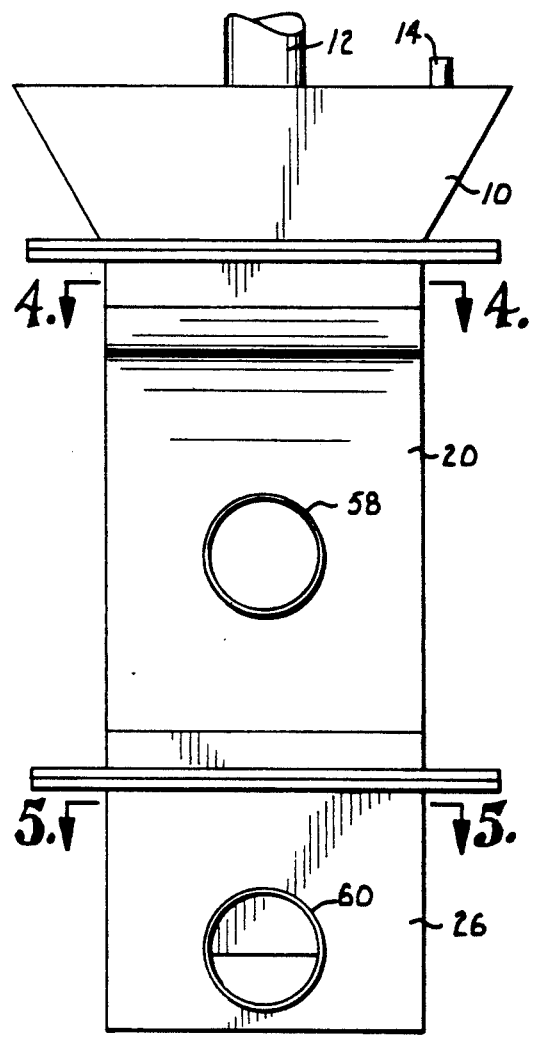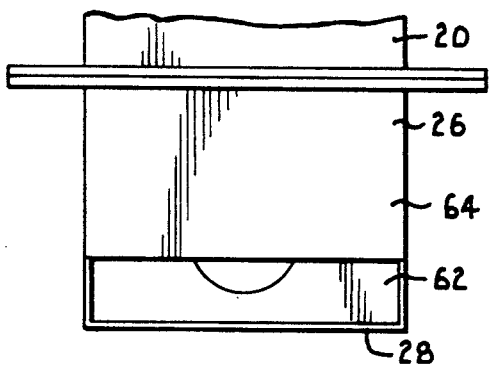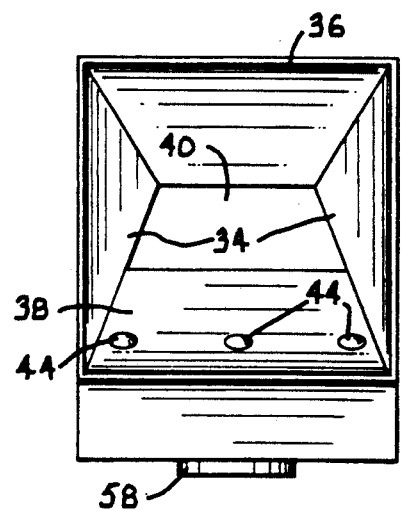

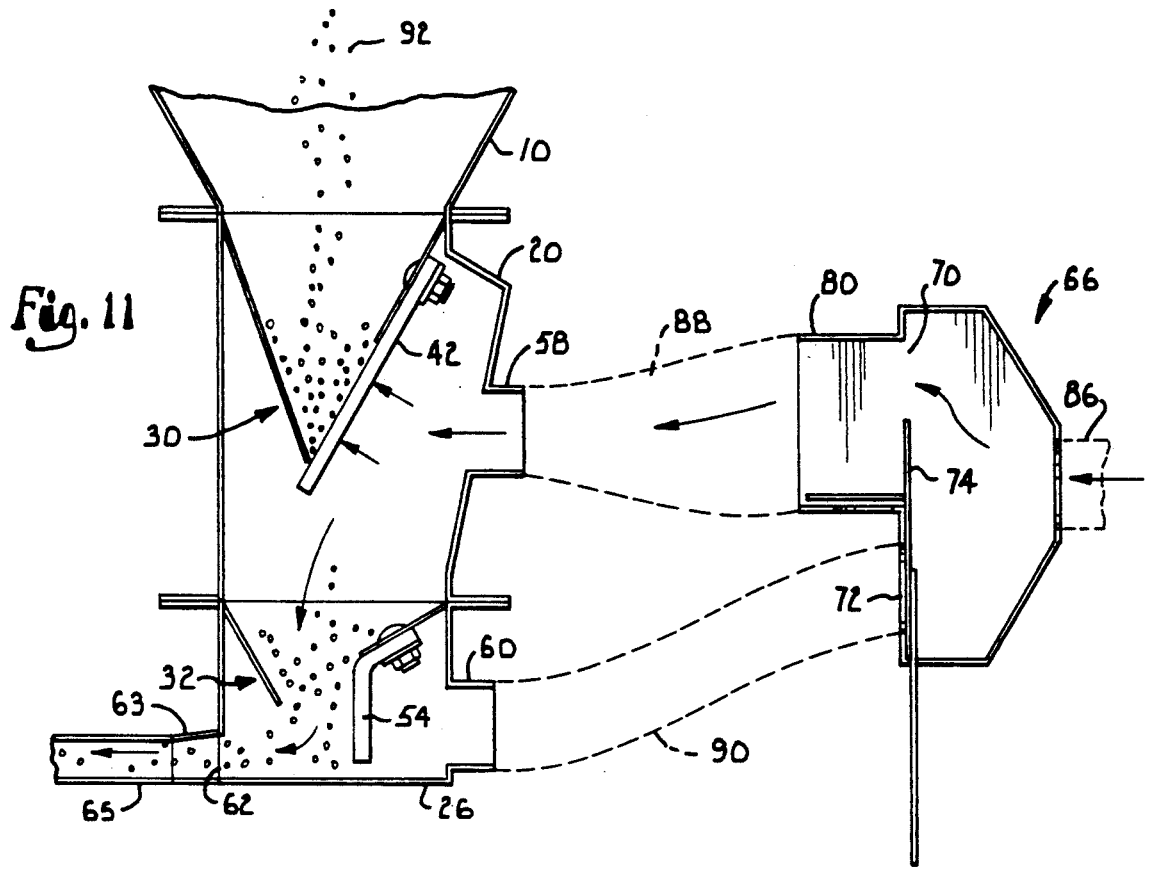
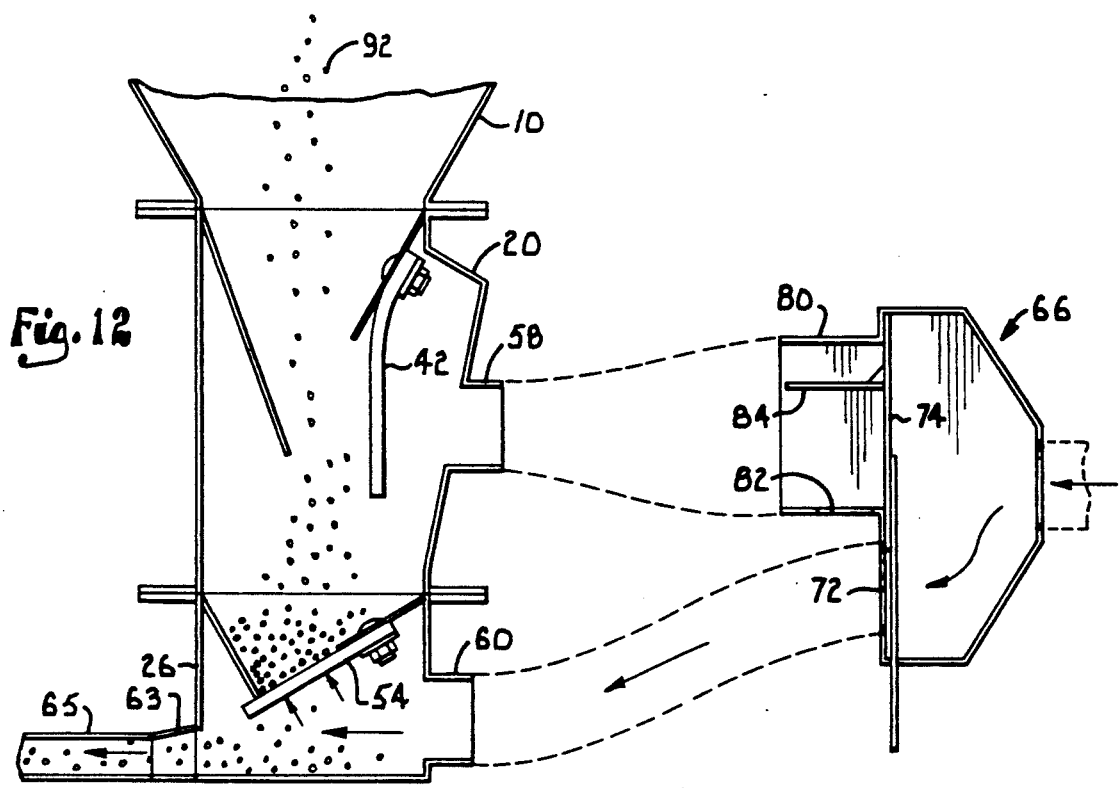

PNEUMATIC CONVEYING SYSTEM

BACKGROUND OF THE INVENTION

1. Field of the Invention

The present invention relates in general to pneumatic conveying systems. In particular, the present invention relates to an improved system for pneumatically conveying abrasive particulate material.

2. Description of the Related Art

The conveying and metering of particulate materials have typically been effected by one of two methods.

The first method employs a rotary air lock. The rotary air lock consists of a sectioned valve member having a plurality of radially extending plates. The valve member is located inside a cylindrical housing for rotation about a horizontal axis, such that the radially extending blades rotate like the spokes of a wheel within the housing. Material is delivered to an intake port of the housing and falls into a section of the valve member between two adjacent plates.

As the valve member rotates within the housing, each section between adjacent plates is sealed against the housing wall. This sealing minimizes the pressure drop across the air lock. As the valve member continues to rotate, each successive section between adjacent plates comes into registration with an exhaust port. The material held between the adjacent plates thus falls out of the exhaust port and onto further conveying means, such as an airstream or a belt conveyor.

The second typical method employs a pressure pot. The pressure pot consists of a chamber having an intake valve and a discharge valve. The discharge valve is first closed while the intake valve is opened. Material to be conveyed is fed from a material hopper into the chamber via the intake valve. The intake valve is then closed and the discharge valve opened. The material within the chamber thus exits the chamber through the discharge valve and falls into further conveying means, such as an airstream or a belt conveyor.

Due to the number of moving parts associated with each of these methods, they are highly unsatisfactory when the conveyed material is abrasive. While it is possible to fabricate the equipment from abrasion resistant material, this often makes the cost of the equipment economically unfeasible.

SUMMARY OF THE INVENTION

It is an object of the present invention to provide a pneumatic conveying system for abrasive particulate material which is simple in design, and in which there are no moving mechanically operated parts or machined parts in the product airstream.

An additional object of the present invention to provide a pneumatic conveying system in which conventional positive displacement blowers or similar pressure air sources can be readily utilized for the movement of particulate materials.

It is a further object of the present invention to provide a pneumatic conveying system in which product check valves are activated by the system conveying air pressure.

These and other objects of the present invention are achieved by a pair of check valves arranged in series and controlled to operate in alternating fashion to provide a substantially continuous flow of particulate material.

The system includes an upper chamber having an intake to receive the product. An intermediate housing is connected to the lower end of the upper chamber. The intermediate housing includes a primary check valve having a discharge port or hole open to the upper container. A movable closure member or gate is positioned and arranged to alternatively open or close the discharge port. A lower housing is in turn connected to the lower end of the intermediate housing. The lower housing also includes a secondary check valve similar to the primary check valve. An exit port or orifice is provided in the lower housing below the secondary check valve.

Each of the intermediate and lower housings include an air inlet downstream of the closure member for the discharge port from such housing. Air pressure delivered through the air inlet associated with the intermediate housing causes the closure gate of the intermediate housing to close and the closure gate of the lower housing to open, thus carrying particulate material received by the intermediate housing to the lower housing and out through the exit port to a material conveying conduit. Air pressure delivered through the air inlet associated with the lower housing causes the closure gate of the lower housing to close and the air stream to travel through the exit port of the lower housing, thus carrying any residual particulate material from the lower housing out through the exit port to a material conveying conduit.

A directional air control valve is interposed between a system blower and the air inlet of each housing. The directional air control valve supplies the system air in an alternating manner to one or the other of the air inlets. This results in one or the other of the primary or secondary check valves being closed while the other check valve is opened. This in turn causes the product to be fed into the system and simultaneously conveyed away with the system air.

Other and further objects of the invention, together with the features of novelty appurtenant thereto, will appear in the course of the following description of the drawings.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a side view of the upper vessel and housings, with portions thereof broken away to show the check valves;

FIG. 2 is a front view of the vessel and housings of FIG. 1, showing the air inlet orifices;

FIG. 3 is a front view of the lower housing showing the product and air exit;

FIGS. 4 and 5 are cross-sectional plan views of the vessel and housings of FIG. 2, taken along lines 4—4 and 5—5, respectively;

FIGS. 11 and 12 are schematic side views showing the operation of the present system;

DETAILED DESCRIPTION OF THE INVENTION

Figure 5:
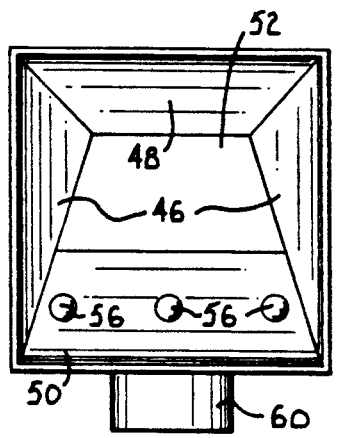
Figure 6:
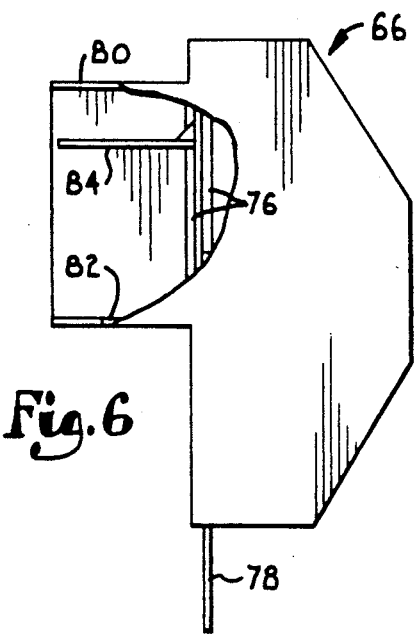
FIG. 6 is a side view with partial cutaway of the air control valve.

FIG. 1 is a side view, in partial cutaway, of a product introduction section of the present invention. This section includes an unpressurized upper vessel 10 having an inlet 12 to receive the particulate product to be conveyed. The upper vessel also includes a vent 14 for venting the interior of the upper vessel to the atmosphere. The lower portion of the upper vessel 10 includes a flange 16 which extends about the bottom periphery of the upper vessel.

The flange 16 of the upper vessel connects to an upper flange 18 of an intermediate housing 20. The intermediate housing 20 is essentially box-shaped and has an open lower end having a lower flange 22 extending about the periphery thereof. This lower flange 22 in turn connects to an upper flange 24 of a lower housing 26. The lower housing 26 is also box-shaped in construction and includes a bottom wall 28.

Each of the intermediate and lower housings 20, 26 include a check valve therein. Specifically, the intermediate housing 20 includes a primary check valve generally designated by 30, and the lower housing 26 includes a secondary check valve generally designated by 32.

The primary check valve 30 has an essentially funnel-shaped configuration with inwardly tapered side walls 34 (FIG. 4). Extending between each of the side walls 34 is a tapered rear wall 36. The rear wall 36 is connected along one edge of the side walls 34 such that the lower end of rear wall 36 is spaced inwardly from the exterior of intermediate housing 20.

Primary check valve 30 also includes a shortened front wall 38. As with the rear wall 36, the front wall 38 extends between the side walls 34 along the edges thereof, such that the lower end of front wall 38 is spaced inwardly of the exterior of intermediate housing 20. The front wall 38 does not extend along the entirety of the edge of side walls 34, but is shortened to form a discharge chute or primary product opening 40.

A primary check valve gate or closure member 42 is movably connected to the front wall 38 to alternatively open or close the primary product opening 40. As illustrated, the primary check valve closure member 42 may be fabricated from a semi-flaccid material, such as belted rubber or a flexible sheeting material, and connected along the upper edge thereof by bolts 44 to the front wall 38. Thus, the primary check valve closure member 42 may freely pivot or bend about the connecting bolts 44 between a sealing or closed position shown in solid line in FIG. 1 and a discharge or open position shown in dashed lines. The check valve closure member 42 could alternatively be a rigid member pivotally connected or hinged in an appropriate manner to alternatively close or open the discharge chute 40.

The secondary check valve 32 is formed similar to that of primary check valve 30. Specifically, secondary check valve 32 includes side walls 46, rear wall 48, a shortened front wall 50 forming a secondary discharge chute or product hole 52, a secondary check valve closure member 54 and connecting bolts 56 connecting the closure member 54 to front wall 50.

Each of the housings 20, 26 includes an air inlet orifice located downstream of the associated closure member 42 or 54. Specifically, intermediate housing 20 includes a primary air inlet orifice 58 located in the rear wall of the intermediate housing. The lower housing 26 includes a secondary air inlet orifice 60 located in the rear wall of the secondary housing 26. Finally, lower housing 26 includes an exit orifice 62 formed by the shortened front wall 64 of the lower housing 26 which results in a void area defining the exit orifice 62. The exit orifice 62 is fitted with an appropriate transition section 63 which, in turn, is connected to a conventional pneumatic conveying conduit 65.

Figure 7:
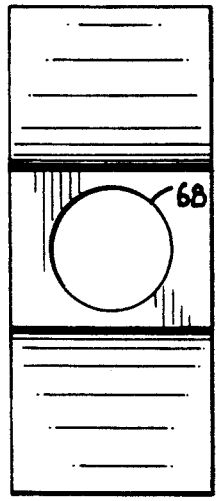
FIG. 7 is a front view of the air control valve of FIG. 6.

The directional air control valve is shown in FIGS. 6–10, and is generally designated by reference numeral 66. While the control valve 66 is shown as a slide valve, it is understood that the control valve could be formed by any air switch means capable of alternating the air stream as described below. FIG. 7 is a front view of the control valve 66, and shows a blower inlet 68 located in the front face of control valve 66. The rear face of control valve 66 includes a primary blower outlet 70 and a secondary blower outlet 72. The air control valve 66 also includes appropriate side and end walls such that air entering the blower inlet 68 must exit the control valve 66 by either the blower outlet 70 or blower outlet 72.

A valve slide 74 is slidingly received within the body of directional air control valve 66. Slide valve 74 is essentially a planar member extending parallel to the planes of the blower outlets 70 and 72. The valve slide 74 is restrained for sliding movement within control valve 66 by appropriate guides 76 within control valve 66. Valve slide 74 also includes an actuation arm 78 fixed thereto and extending outwardly from the body of directional air control valve 66. The actuation arm 78 will be connected to an appropriate actuator to cause reciprocation of the valve slide 74 within control valve 66, as described in more detail below.

Figure 8:
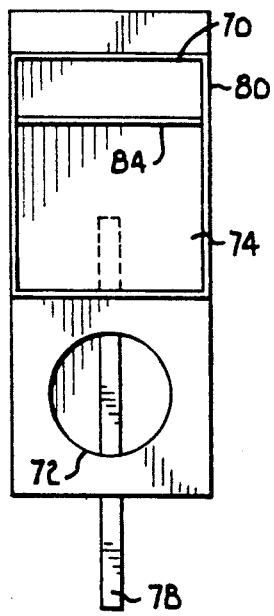
FIGS. 8 and 9 are rear views of the air control valve of FIG. 6 with the valve in the primary and secondary conditions, respectively.
Figure 9:
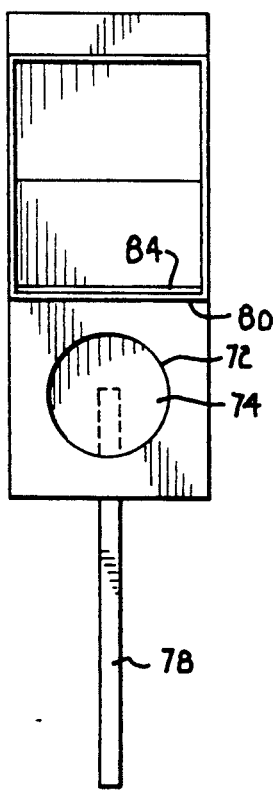
Figure 10:
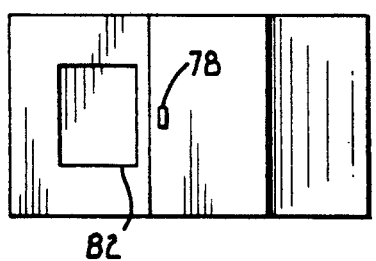
FIG. 10 is a bottom view of the control valve of FIG. 6.

The valve slide 74 reciprocates within the control valve 66 between a first position, shown in FIG. 8 in which the control valve blocks the primary blower outlet 70, and a secondary position, shown in FIG. 9, in which the valve slide 74 blocks the secondary blower outlet 72.

Control valve 66 also includes an outlet extension 80 surrounding the primary blower outlet 70 and extending outwardly from the control valve 66. Located within the outlet extension 80 is a valve vent 82, best shown in FIG. 10, in the form of a through-hole extending through the outlet extension 80. The valve slide 74 also includes a vent extension 84 extending outwardly from the plane of the valve slide and within the outlet extension 80. The vent extension 84 is of an appropriate size and configuration to block the valve vent 82 when the valve slide 74 is in the second position, as shown in FIG. 9. When the valve slide 74 is in the first position, as shown in FIG. 8, the valve slide 74 blocks the primary blower outlet 70, but the vent extension 84 is spaced from valve vent 82, thus opening the valve vent. The need for the valve vent 82 and valve extension 84 will be apparent from a consideration of the operation of the system.

The operation of the system is described with reference to FIGS. 11 and 12. In FIG. 11 the directional air control valve 66 is shown in combination with the primary and secondary check valves. It is first noted that the air control valve 66 will include an appropriate inlet duct 86 extending from a system blower or other conventional source of air pressure. The inlet duct 86 is connected to the blower inlet 68 of control valve 66. A primary duct 88 extends between the valve extension 84 and primary air inlet orifice 58. A secondary duct 90 is connected between the secondary blower outlet 72 and the secondary air inlet orifice 60.

In FIG. 11, particulate material 92 has entered the inlet 12 of upper vessel 10 and has fallen through the open lower end of upper vessel 10 into the primary check valve 30 of the intermediate housing 20. The directional air control valve 66 is in the secondary position, and as such air entering the directional air control valve may exit control valve 66 only through primary blower outlet 70. It is also noted that the vent extension 84 blocks the valve vent 82 such that air may not escape via the valve vent.

The air from the blower exits the primary blower outlet 70 and travels through primary duct 88 and into the primary air inlet orifice 58. Because the air pressure on the downstream side of the closure member 42 is greater than pressure on the upstream side of the closure member 42, closure member 42 is forced to sealing engagement of the discharge port 40 and to remain in such closed position. The incoming particulate material 92 to vessel 10 will thus accumulate on the upstream side of closure member 42 within the primary check valve 30.

Because the combined air pressure and particulate weight on secondary check valve closure member 54 is greater than the downstream pressure on closure member 54, closure member 54 is forced to an open position as shown in FIG. 11. The air entering the intermediate housing 20 is thus forced through the secondary product hole 52 and out the exit orifice 62 in the lower housing 26. Any particulate material previously residing in the intermediate housing 20 on the upstream side of closure member 54 will thus be discharged to the lower housing 26 and out through the exit port to a material conveying conduit.

After a preselected time the valve slide 74 is moved from the secondary position shown in FIG. 11 to the first position, as shown in FIG. 12. In this position the primary blower outlet 70 is blocked by the valve slide 74 and the exhaust port 82 is opened so that the downstream pressure on closure member 42 becomes atmospheric. Secondary blower outlet 72 is also simultaneously opened. The air entering the control valve 66 thus exits through the secondary blower outlet 72 and travels through the secondary duct 90 to enter the secondary air inlet orifice on lower housing 26. Because the air pressure on the downstream side of the closure member 54 is now greater than pressure on the upstream side of the closure member 54, closure member 54 is forced to sealing engagement of the discharge port 52 and to remain in such closed position. The air stream also entrains any particulate material previously residing in the lower housing 26 and carries it out the exit orifice 62 through transition piece 63 to conveying conduit 65. With the valve slide 74 positioned as in FIG. 12, the pressure on the downstream side of closure member 42 becomes atmospheric, allowing closure member 42 to open and discharge particulate matter to the secondary check valve means. Thus, the particulate material collects on the upstream side of the closure member 54 in the closed position as illustrated in FIG. 12.

After a preselected time, the slide 74 is again moved to the second position as illustrated in FIG. 11. This will result in the check valve members assuming the positions shown in FIG. 11, and the entire process cycle will be repeated as previously described. Thus, air pressure on the respective check valves arranged in series can be alternatively switched to open one such valve while closing the other. This action during continued and repeated cycles results in a steady state stream of entrained particulate material flow which closely approximates a continuous flow condition.

It should thus be apparent from the above description, that no mechanical means are necessary for actuation of the primary and secondary check valve members 42, 54. Rather, the system air used to entrain the particulate material is the activating force for these valve members. Additionally, the upper vessel and housings do not require close tolerance fits, which reduces the production costs for the system. The use of belted rubber for the check valve members 42 and 54 ensures that these members are also inexpensive, yet rugged. By the provision of an access plate in the side wall of the housings 20, 26 the check valve members 42, 54 may be readily replaced upon wear.

Figure 13:
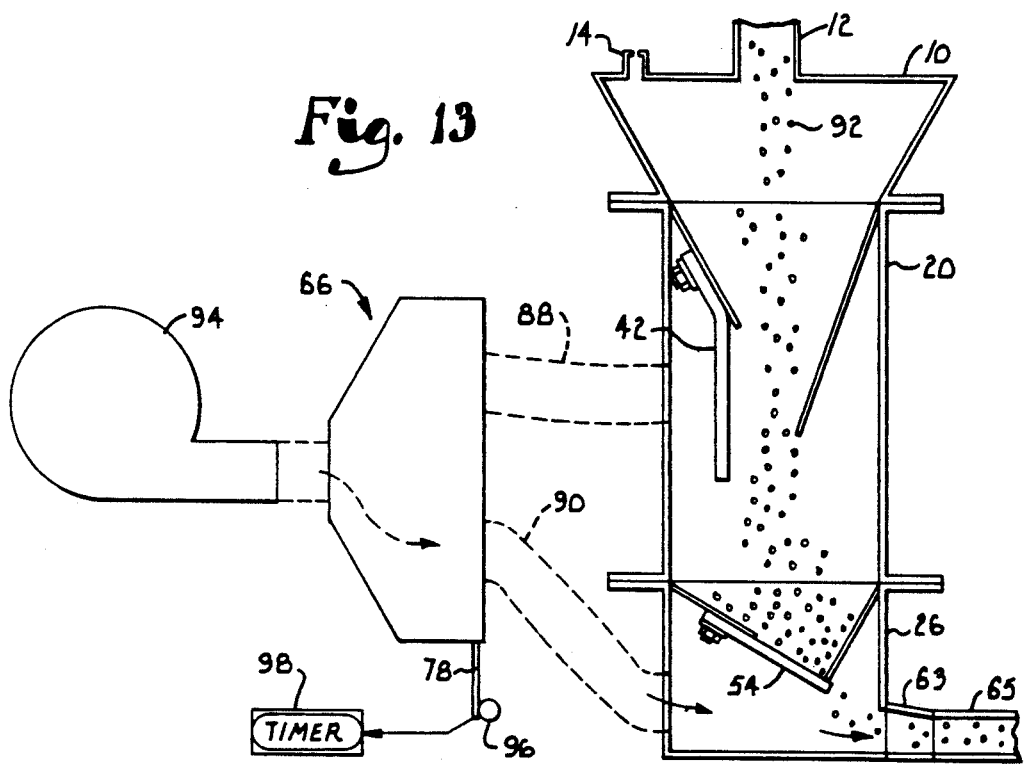
FIG. 13 is a schematic view showing the air control valve and check valves within a complete system having an unpressurized material feed source.
Figure 14:
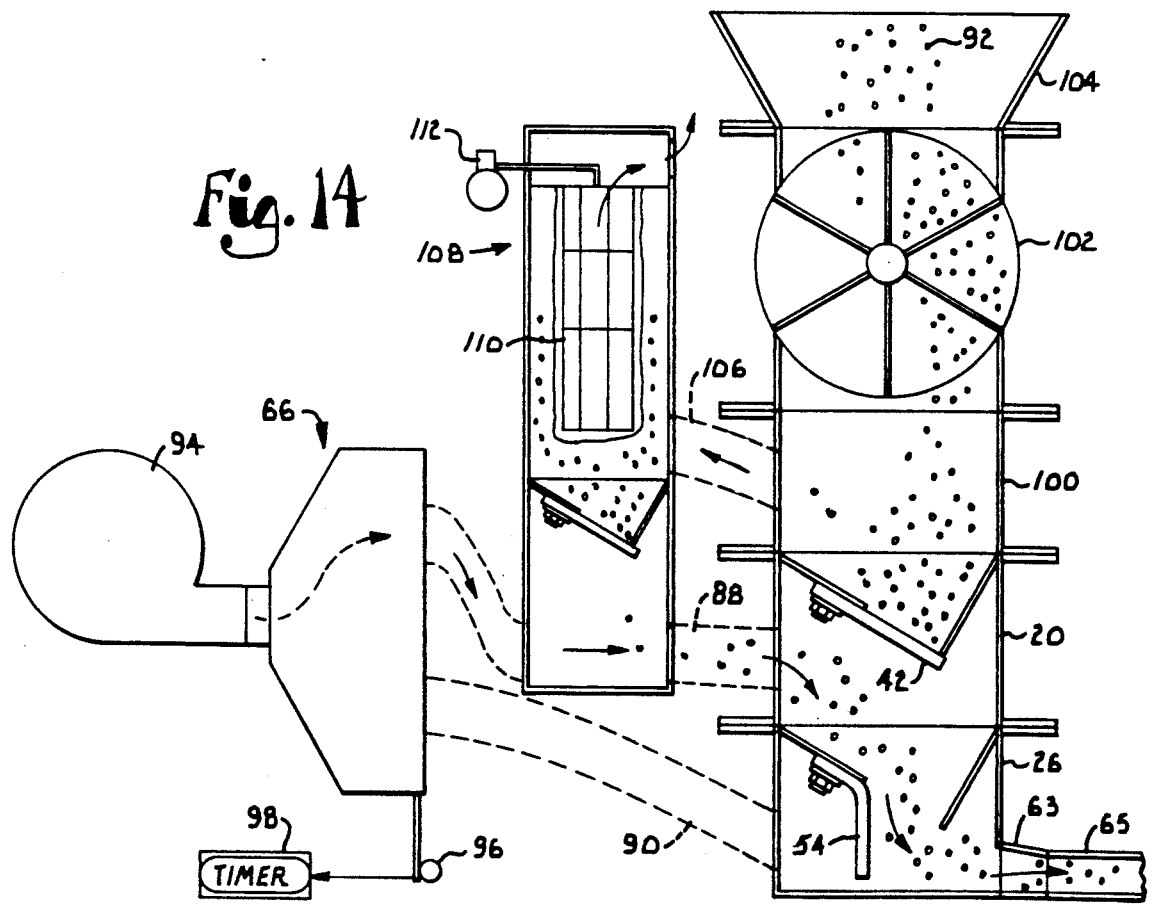
FIG. 14 is a schematic view showing the air control valve and check valves within a complete system having a pressurized material feed source.

Complete pneumatic conveyance systems are schematically shown in FIGS. 13 and 14. FIG. 13 relates to a system having an unpressurized material feed source and FIG. 14 relates to a system having a pressurized material feed source.

In FIG. 13 a complete system is shown for a situation in which the product feed for the primary check valve is under atmospheric pressure, such as a grain wagon or the like. This arrangement is very similar to that shown in FIGS. 1, 11 and 13, and may include an upper vessel 12 having an inlet 12 and vent 14. A blower 94 is shown in operative connection with the directional air control valve 66. The reciprocation of the valve slide 74 is effected by a double acting cylinder 96 connected to the actuation arm 78 of the air control valve 66. The double acting cylinder 96 is controlled by a timer 98, which is preferably adjustably set. In this regard, the time elapsed at each position of the valve slide may be independently adjustable, or the time equal for both positions and adjustable. It is also noted that any other controllable means for reciprocating the valve slide could be employed.

The operation of this system is the same as that described above, with the timer 98 controlling the position of the double acting cylinder 96. The position of cylinder 96 in turn determines the position of the actuation arm 78 and thus valve slide 74. As such, the timer 98 controls the alternation in air flow through the primary duct 88 or secondary duct 90.

FIG. 14 shows a complete system where the product feed may be from a pressurized source such that particulate material to the system of this invention is fed through a pressure gate like a rotary air lock. This system includes a blower 94 operatively connected to the control valve 66, with ducts 88 and 90 connected to the intermediate housing 20 and lower housing 26, respectively. This system is different, however, in that the feed source cannot be vented (as by means of vent 14 in FIG. 13) and, indeed, will ordinarily operate at a positive pressure. Such feed system is illustrated as an rotary air lock 102 feed delivery from a product hopper 104.

The particulate material 92 is fed from the product inlet hopper 104 and enters the areas between the revolving vanes of rotary air lock 102. Upon further rotation, the particulate material falls from this area between the air lock vanes into the top chamber 100. The provision of the air lock thus eliminates natural venting above the primary check valve which otherwise provides for the air pressure closure of the primary check valve as in the FIG. 13 system.

The vent chamber 100 includes a vent pipe 106 leading to a filter device generally designated by reference numeral 108. The vent pipe 106 opens into a main chamber or dirty air plenum of a baghouse or filter device 108. Housed within the main chamber is a filter bag and cage 110. The air entering the filter device 108 may exit only by passing through the filter bag and cage to exit into the atmosphere. As such, particulate materials entrained with the air are deposited on the filter bag, resulting in the venting of clean air from the filter device 108.

The filter device 108 also includes a pulse jet air source 112 which is directed into the interior of filter bag and cage 110. At pre-set intervals the pulse air source 112 will emit a blast of high pressure air into the filter bag and cage. This will result in the particulates deposited on the filter bag falling therefrom downwardly within the filter device 108. The lower end of filter device 108 includes a check valve 114. The particulate matter falling through the filter device after actuation of pulse air source 112 will settle upon the check valve 114. When the downstream pressure on the check valve 114 becomes less than the upstream pressure, the check valve 114 will open to discharge any particulate material collected thereon. The particulate matter can then be collected in a container, or be fed back into the system by interposing the check valve 114 in the primary air duct 88 as illustrated. A further option is to form the check valve 114 as a manual valve which is opened at preset maintenance intervals to remove the accumulated particulate material for collection in a container.

The systems described above are particularly suited to dilute phase pneumatic conveyance. Specifically, a high air volume will pass through the system at a low pressure, normally from 1-10 psi maximum. However, the present system can be modified to dense phase conveying. In such a situation, the primary and secondary air inlet orifices 58, 60 are extended within the respective housings such that the air orifices have exit ends in close proximity to the associated check valve members 42, 54 when the check valve members are in their open positions. A lower air volume will be used for dense phase conveying, but the air pressure will be higher, normally between 15-100 psi.

From the foregoing it will be seen that this invention is one well adapted to attain all ends and objects hereinabove set forth together with the other advantages which are obvious and which are inherent in the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. An apparatus for introducing material into an airstream for pneumatic conveyance, comprising:

housing means adapted to receive the material at an inlet and expel the material in an entraining airstream at an exit;

primary check valve means disposed downstream of said inlet and adapted to receive the material from said inlet, said primary check valve means including a primary product hole adapted to allow the material to move therethrough and a primary check valve member mounted adjacent to said primary product hole and movable between a first position closing said primary product hole and a second position spaced from said primary product hole;

a primary air inlet disposed downstream of said primary check valve means and adapted to channel the entraining airstream therethrough, said primary air inlet being disposed in facing relation to said primary check valve member;

secondary check valve means disposed downstream of said primary air inlet and adapted to receive the material from said primary check valve means, said secondary check valve means being disposed upstream of said exit of said housing means and said secondary check valve means including a secondary product hole adapted to allow the material to move therethrough and a secondary check valve member mounted adjacent to said secondary product hole and movable between a first position closing said secondary product hole and a second position spaced from said secondary product hole;

a secondary air inlet disposed downstream of said secondary check valve means and upstream of said exit of said housing means and adapted to channel the entraining airstream therethrough, said secondary air inlet being disposed in facing relation to said secondary check valve member;

a source of air having sufficient current and pressure to entrain the material, such current and pressure forming the entraining airstream; and means for connecting said entraining air source alternately to said primary air inlet and said secondary air inlet, whereby the air current and pressure will intermittently act upon each of said check valve members to move said check valve member from said second position to said first position, alternately opening and closing said check valve means and entraining the material downstream thereof.

2. An apparatus as in claim 1, wherein each of said product holes is oblique to a vertical plane, and wherein each of said check valve members comprises an at least semi-flaccid member having an upper edge thereof mounted to an upper edge of the associated one of said product holes, whereby each said check valve member will normally hang downwardly under the force of gravity spaced from said associated product hole, such downward hanging constituting said second position.

3. An apparatus as in claim 1, wherein said means for alternately connecting said air source comprises:

a directional air control valve housing;

a blower inlet operatively connected to said air supply;

a primary blower outlet operatively connected to said primary air inlet;

a secondary blower outlet operatively connected to said secondary air inlet;

a valve slide connected to said air control valve housing and movable between a first position blocking said primary blower outlet while said secondary blower outlet is open, and a second position blocking said secondary blower outlet while said primary blower outlet is open; and means for moving said valve slide alternately between said first and said second positions.

4. An apparatus as in claim 3, wherein said valve slide reciprocates between said first and said second positions, and wherein said means for moving said valve slide comprises:

a double acting cylinder operatively connected to said valve slide; and means for controlling said cylinder.

5. An apparatus as in claim 4, wherein each of said product holes is oblique to a vertical plane, and wherein each of said check valve members comprises an at least semi-flaccid member having an upper edge thereof mounted to an upper edge of the associated one of said product holes, whereby each said check valve member will normally hang downwardly under the force of gravity spaced from said associated product hole, such downward hanging constituting said second position.

6. An apparatus as in claim 3, further comprising means for venting said primary air inlet to atmosphere when said valve slide is in said first position.

7. An apparatus as in claim 6, wherein said means for venting comprises:

an outlet extension on said primary blower outlet extending outwardly from said air control valve housing, said outlet extension being operatively connected to said primary air inlet;

a valve vent extending through said outlet extension and connecting said outlet extension to atmosphere; and a vent extension connected to, and extending outwardly from, said valve slide, said valve vent and valve extension being configured such that said vent extension blocks said valve vent when said valve slide is in said second position, and opens said valve vent when said valve slide is in said first position.

8. An apparatus as in claim 7, wherein each of said product holes is oblique to a vertical plane, and wherein each of said check valve members comprises an at least semi-flaccid member having an upper edge thereof mounted to an upper edge of the associated one of said product holes, whereby each said check valve member will normally hang downwardly under the force of gravity spaced from said associated product hole, such downward hanging constituting said second position.

9. An apparatus as in claim 7, wherein said housing means, upstream of said primary check valve means, includes a vent to atmosphere.

10. An apparatus as in claim 9, wherein said vent of said housing means includes filter means.

11. A method of introducing material into an airstream for pneumatic conveyance, comprising the steps of:

a) dispensing a quantity of the material;

b) allowing at least a portion of the quantity to accumulate;

c) dispensing the portion and allowing the portion to accumulate;

d) repeating step b) while substantially simultaneously introducing a sole entraining and conveying air current and pressure upstream of the portion accumulated in step c), and downstream of the portion accumulated in step b), to entrain therein at least a sub-portion of the portion of step c) and therefore pneumatically convey said subportion;

e) repeating step c) while substantially simultaneously introducing a sole entraining and conveying air current and pressure downstream of the portion accumulated in step c) to entrain therein the remainder of the portion of step c) and therefrom pneumatically convey said subportion; and f) repeating steps c) and d).

12. A method as in claim 11, further comprising, prior to step a), the step of providing primary and secondary check valve means, said primary check valve means being disposed upstream of said secondary check valve means, and wherein step b) comprises maintaining said primary check valve means in a closed position while maintaining said secondary check valve means in an open position, and step c) comprises maintaining said primary check valve means in an open position while maintaining said secondary check valve means in a closed position.

13. A method as in claim 12, wherein said step of providing check valve means comprises providing check valve means which are normally maintained in said open position but are maintained in said closed position by application of said air current and pressure downstream of the respective one of said check valve means, and wherein step b) comprises introducing said air current and pressure downstream of said primary check valve means, and upstream of said secondary check valve means, to maintain said primary check valve means in said closed position, step c) comprises discontinuing said air current and pressure upstream of said secondary check valve means and introducing said air current and pressure downstream of said secondary check valve means to maintain said secondary check valve means in said closed position, and wherein said introduction of said airstream in steps d) and e) comprises said introduction of said airstreams in steps b) and c), respectively.

14. A method as in claim 13, wherein step c) further includes allowing venting to atmosphere downstream of said primary check valve means and upstream of said secondary check valve means.

* * * * *